Dec. 29, 1936.  K. H. HUBBARD  2,065,702
AIR OPERATED CONTROL SYSTEM
Filed Jan. 20, 1934  3 Sheets-Sheet 1
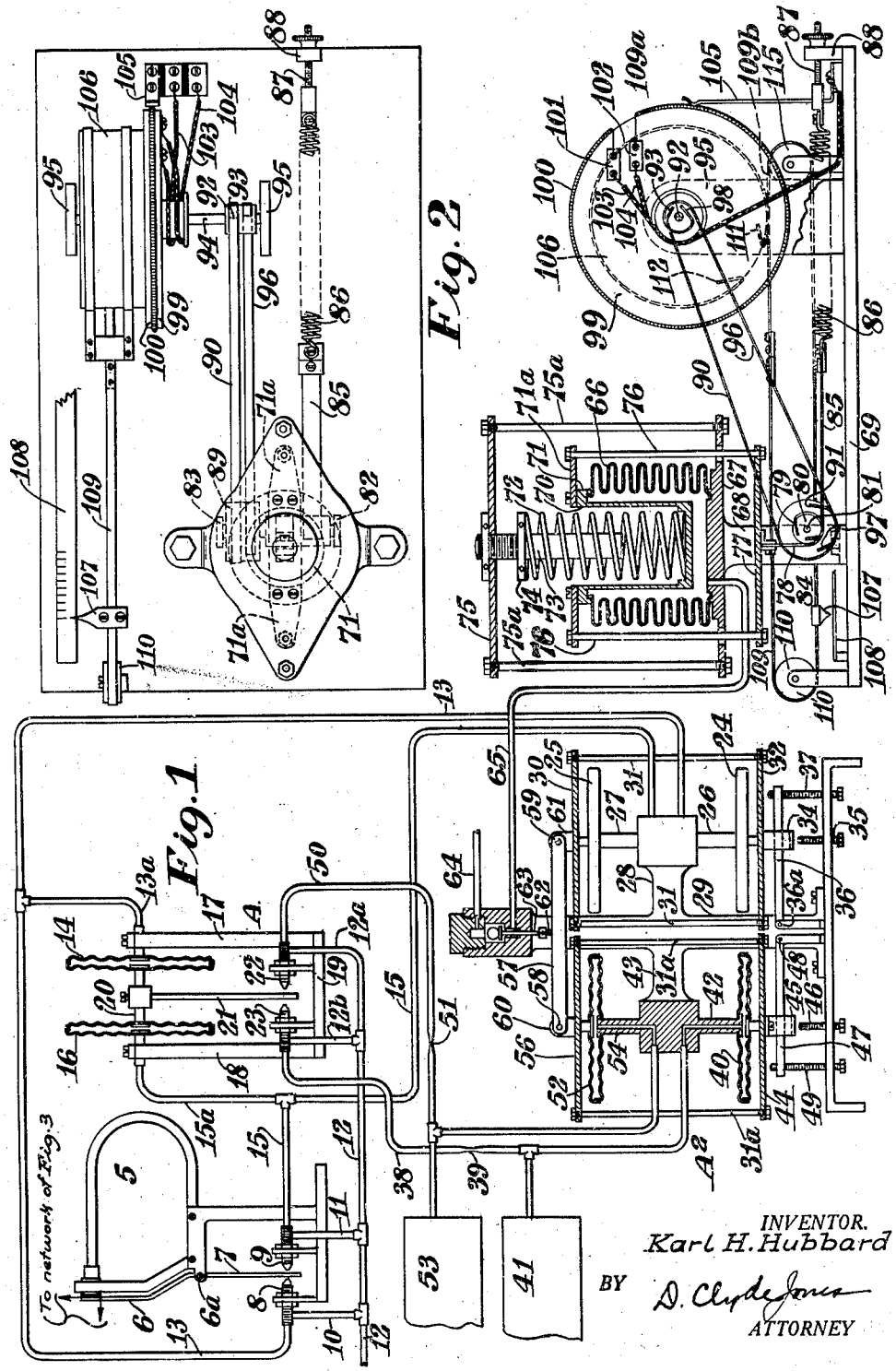
INVENTOR.
Karl H. Hubbard
BY D. Clyde Jones
ATTORNEY Dec. 29, 1936. K. H. HUBBARD 2,065,702
AIR OPERATED CONTROL SYSTEM
Filed Jan. 20, 1934 3 Sheets-Sheet 2
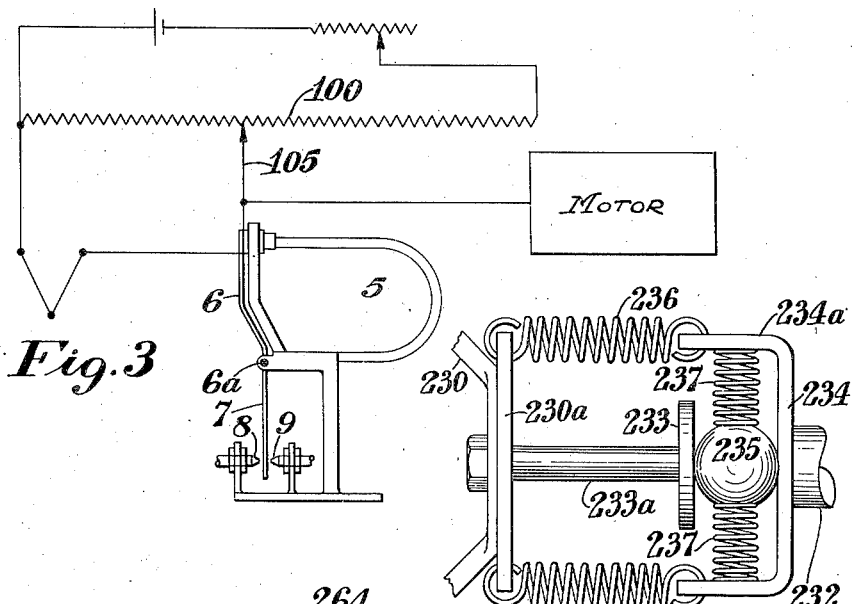
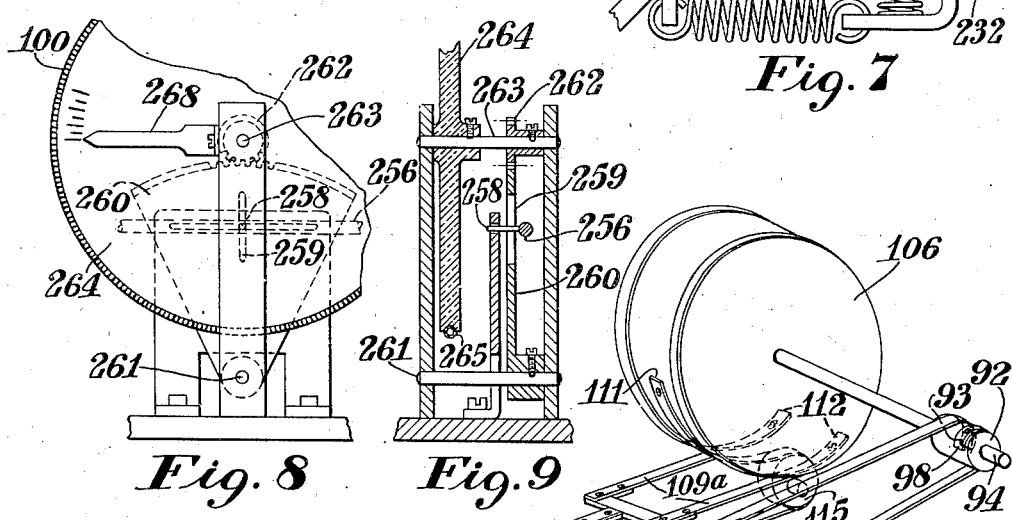
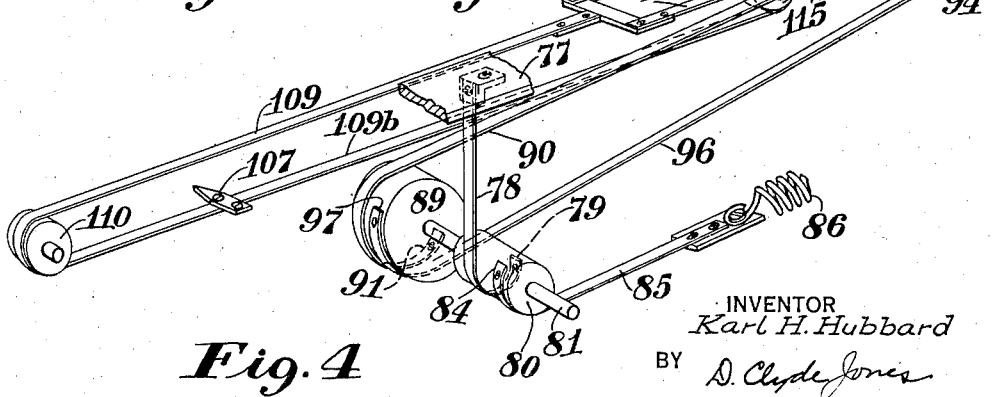
INVENTOR
Karl H. Hubbard
BY
D. Clyde Jones
ATTORNEY

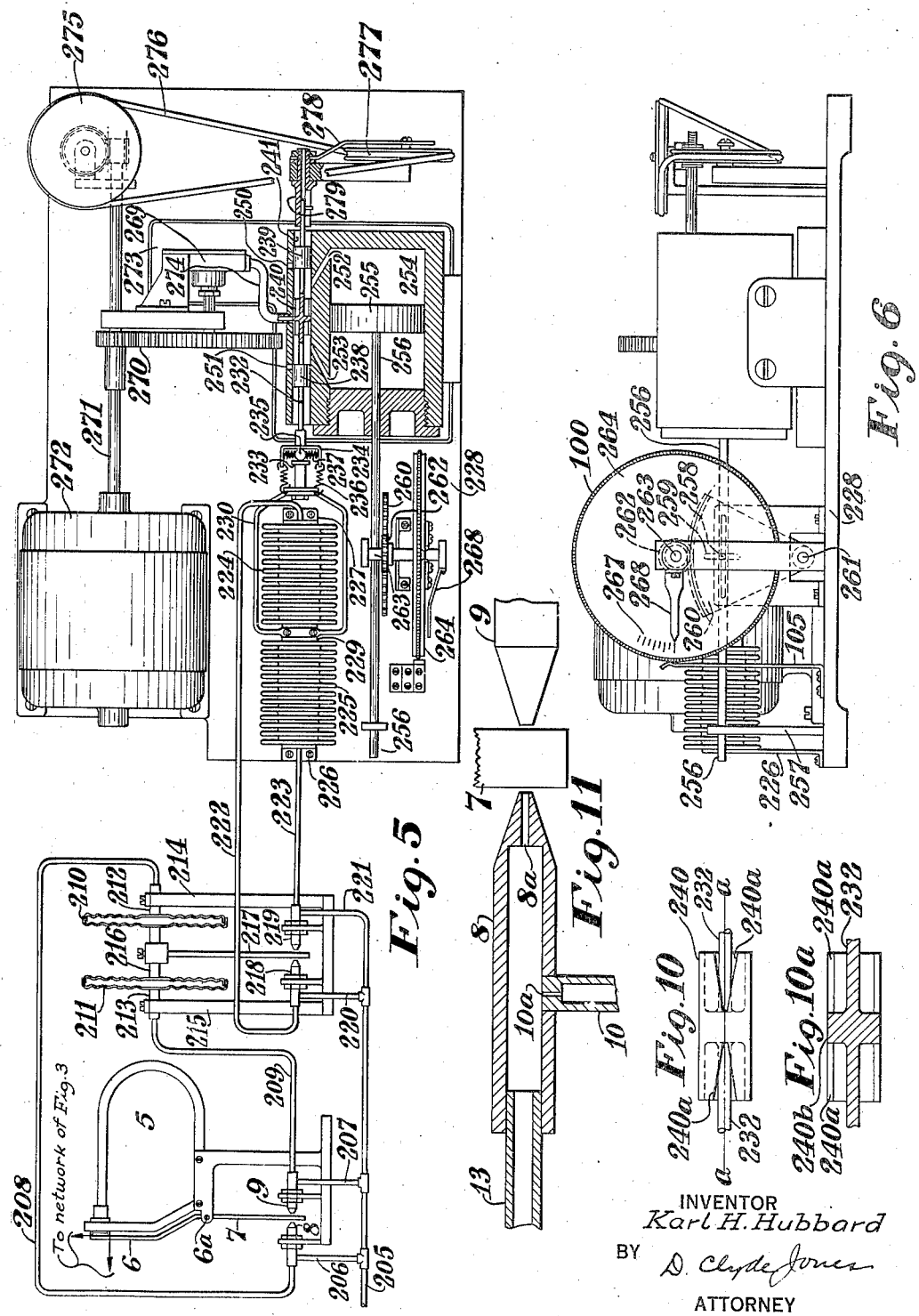

Patented Dec. 29, 1936

2,065,702

UNITED STATES PATENT OFFICE 2,065,702

AIR-OPERATED CONTROL SYSTEM

Karl H. Hubbard, Rochester, N. Y., assignor to Taylor Instrument Companies, Rochester, N. Y., a corporation of New York Application January 20, 1934, Serial No. 707,621

7 Claims. (Cl. 171—229)

This invention relates to fluid-operated amplifiers and more particularly to control systems in which such amplifiers form a part.

In prior amplifiers of this type any variation in fluid pressure resulted in an error in the operation of the amplifiers, and therefore in accordance with the present invention an amplifier is provided including a movable element to control the leakage from two streams of pressure fluid flowing from a pressure fluid source to two elements operated thereby which effect an amplified response faithfully reproducing a primary response.

In prior control systems where it has been desired to adjust a member to a position corresponding to an indicated condition, it has been customary to develop a weak primary response corresponding to the changing condition and then mechanically or electrically to amplify said response to such a degree that it controls sufficient force to move said member to a predetermined position indicated by said condition. In certain installations it is desirable to employ fluid pressure amplification, since such amplification is especially quick in response and can develop large forces.

In accordance with the present invention it is also proposed to provide a system of control in which a relatively weak primary response is amplified by a pressure fluid amplifier or amplifiers into a relatively powerful response which, in turn, is employed to control the adjustment of a member to a definite position corresponding to said primary response.

In its more specific aspects, the invention relates to an automatically adjusted air-operated pyrometer system incorporating therein an electrically balanced network which is herein disclosed as including an automatic potentiometer.

For a clearer understanding of the invention reference is made to the drawings in which Fig. 1 illustrates in side elevation, the mechanical portion of an air-operated pyrometer system including a galvanometer, a fluid-operated primary amplifier, a secondary fluid-operated amplifier and an air-operated motor with certain of the parts thereof represented as being broken away; Fig. 2 is a plan view of the motor of Fig. 1; Fig. 3 is a diagrammatic showing of an automatic potentiometer network, together with a galvanometer included therein; Fig. 4 is a perspective view of the means operated from the air-motor of Figs. 1 and 2, for moving an adjustable indicator and for adjusting the potentiometer; Fig. 5 illustrates a modified form of an automatic pyrometer system with the potentiometer network thereof omitted, at the right of which figure there is illustrated a plan view partially in section, of an oil motor and related mechanism; Fig. 6 is a front elevation of the oil motor of Fig. 5; Fig. 7 is a detail view of a universal coupling used in connection with the oil motor of Fig. 5; Figs. 8 and 9 are respectively a front elevation and a vertical section of the resistor of the potentiometer and the means for operating the same; Fig. 10 is an enlarged top view of a slide valve employed in the oil motor of Fig. 5, while Fig. 10a is a sectional view taken on the line a—a of Fig. 10; and Fig. 11 is a detail view of a pair of opposed nozzles of an amplifier in which one of the nozzles is shown in longitudinal cross section.

Referring to Fig. 1, 5 designates a galvanometer having an arm 6 pivoted at 6a which arm at its upper end carries a movable coil actuated by changes in the conditions in an electrical network (Fig. 3) to be referred to, due to temperature changes. The arm 6 has, at its lower end, a baffle plate 7 normally positioned midway between the rigidly supported nozzles 8 and 9 which are identical in construction. These nozzles are respectively connected through branch conduits 10 and 11, to a main conduit 12 leading to a common source of pressure fluid, such as compressed air, although the system will function equally well with a compressed liquid such as oil or water. As best shown in Fig. 11, each branch conduit such as 10, admits pressure fluid through inlet orifice 10a into its related nozzle such as 8 from which a portion of the fluid leaks away through nozzle orifice 8a. It will be noted that the diameter of nozzle orifice 8a is somewhat larger than that of the inlet orifice 10a. The nozzle 8 communicates through conduit 13 and branch conduit 13a with a capsular diaphragm 14 of a primary amplifier generally designated A, while the nozzle 9 likewise communicates through conduit 15 and branch conduit 15a with capsular diaphragm 16, also forming a part of the primary amplifier. The capsular diaphragms 14 and 16, which are identical, have their remote surfaces mounted respectively on uprights 17 and 18 of a supporting base or frame 19, and have their opposing surfaces connected together through a substantially rigid rod 20 on which there is adjustably supported the baffle 21. The free end of this baffle extends between the nozzles 22 and 23 (of the same construction as illustrated in Fig. 11) which are rigidly supported on arms extending upwardly from the base 19 and which communicate through branches 12a and 12b, respectively, with the supply conduit 12.

The conduits 13 and 15 also extend to the right-hand or low-sensitivity side of a secondary amplifier generally designated A2, the conduit 13 communicating with the capsular diaphragm 24 and the conduit 15 communicating with the capsular diaphragm 25. The connections between these conduits and their respective diaphragms are identical with those shown in the sectionalized portion of the secondary amplifier A2, as indicated in the lower left-hand portion of Fig. 1. The inner or opposing faces of the capsular diaphragms 24 and 25 are mounted on posts 26 and 27 carried by the extension 28 forming a part of an upright support 29. The upper surface of the diaphragm 25 is fastened at its center to an intermediate point on the cross bar 30, which bar is connected at its ends by the rods 31 to a similar cross bar 32 to form therewith a cage. The lower surface of the diaphragm 24 is connected at its center to an intermediate point on the cross bar 32. This cross bar has a loop 34 attached thereto, the lower portion of which may engage an adjustable stop 35 to limit the downward movement of the cage, while an arm 36 pivoted at 36a passes through the loop and is adjusted by means of the set screw 37 to engage the inner surface of the loop thereby limiting the upward movement of the cage.

The left-hand portion of the secondary amplifier A2 as shown in cross section, is substantially identical with that of the right-hand portion of this amplifier just described. The mentioned nozzle 23 which is connected to branch conduit 12b, communicates through conduit 38 and constriction 39 with a capsular diaphragm 40 of the secondary amplifier. The conduit 38 between the constriction 39 and the diaphragm 40, communicates with an air damping chamber 41 which may be in the form of a reservoir of relatively large capacity. This reservoir in conjunction with the mentioned constriction, functions to delay the response of this diaphragm. The upper surface of the diaphragm 40 is fixedly mounted at its center to an arm 42 forming a part of an extension 43 carried by the upright 29 of the amplifier frame. The lower or free surface of the diaphragm 40 is connected at its center to a cross bar 44. On this cross bar there is mounted a loop 45, the lower surface of which may engage an adjustable set screw 46 mounted on the amplifier frame and which serves as a stop for the downward movement of the left-hand cage of the secondary amplifier. An arm 47 pivoted at 48, which arm passes through the loop 45, is adjustable upwardly and downwardly by means of the set screw 49 so that the arm 47 may engage an inner surface of the loop to limit the upward movement of the left-hand cage.

The mentioned nozzle 22 of the primary amplifier communicates through conduit 50 and constriction 51 with a capsular diaphragm 52 of the secondary amplifier. At a point between the constriction 51 and the diaphragm 52, a damping chamber 53 of relatively large capacity communicates with the conduit 50 and functions with the mentioned constriction, to delay the action of the diaphragm 52. The lower surface of the diaphragm 52 is mounted at its center on a post 54 carried by the extension 43 of the frame of the secondary amplifier. The upper or free surface of diaphragm 52 has fastened thereto at a central point a post attached to a horizontal bar 56. The bars 44 and 56 which are held in spaced relation at their ends by rods 31a, form the left-hand cage of the secondary amplifier. A horizontal bar 57 has its ends pivoted at 58 and 59 to uprights 60 and 61, respectively mounted on the cross bars 56 and 30 of the respective cages. At an intermediate point on the horizontal bar 57, there is located an adjustable set screw 62 to engage the valve stem 63 of a pilot valve. This valve controls the flow of pressure fluid from a source not shown, through the inlet 64 to the outlet conduit 65, which conduit communicates with the bellows 66 of an air motor.

The bellows of this motor at its lower edge is joined by an air-tight connection to a circular plate 67 secured to the rigid upright 68 mounted on the base 69. The upper edge of the bellows 66 is fastened by an air-tight joint to a rigid cup 70 which has its open end joined to an annular member 71 to which arms 71a are secured. A spiral spring 72 at its lower end engages the bottom of the cup 70 and at its upper end engages a stop 74 mounted on a rod extending into the spring. Rod 73 is adjustably mounted on a plate 75 held in spaced relation to the plate 67 by rods 75a. The arms 71a support a cage including vertical rods 76 which at their lower ends support a horizontal bar 77 in spaced relation to the mentioned arms. A flexible metal tape 78 (more clearly shown in Fig. 4) has one end connected to an intermediate point on the cross bar 77 and has its other end secured at 79 to a point on the periphery of the drum 80. This drum is mounted on a shaft 81 journaled at 82 and 83 (Fig. 2) in uprights on the frame 69. At a point 84 on the drum 80 there is secured at one end a metal tape 85 which has its other end connected to one end of a spiral spring 86, while the opposite end of this spring is connected by an adjustable element 87, to an upright 88 on the base so that the tension of the spiral spring may be adjusted at will. The shaft 81 also carries a drum 89 about a portion of the periphery of which a metal tape 90 passes and has one of its ends attached thereto as shown at 91. The other end of the tape 90 is attached to drum 92 as indicated at 93, which drum is mounted on the shaft 94, in turn, suitably journaled in uprights such as 95 (Fig. 1) on the base 69. A second metal tape 96 has a portion near one end engaging part of the drum 89 to which this end of the tape is attached as shown at 97. The other end of the tape 96 engages a portion of the periphery of the drum 92 and is attached thereto, as indicated at 98.

The shaft 94 also carries an insulating disc 99 having a resistor element 100 in the form of a coiled wire mounted on its periphery. This resistor wire terminates at contact terminals 101 and 102 which are connected respectively to flexible conductors 103 and 104. A flexible contactor 105 insulatedly mounted at its lower end on the base 69, has its free end engaging the surface of the resistor 100 to function therewith as a voltage divider of the potentiometer network. The shaft 94 also carries a drum 106 to actuate tapes to be described, which operate certain indicating or recording means herein shown as being a pointer 107 movable over a graduated scale 108. The actuating means for the pointer includes tape 109 passing about pulley 110 and having one of its end portions divided as indicated at 109a and wrapped around a portion of the drum 106 to which it is attached, as indicated at points 112. The other portion 109b of this tape after passing about pulley 115 is joined to the periphery of the drum 106 as indicated at 111.

In the operation of the system the galvanometer 5 moves its arm 6 in response to an unbalanced condition of the network of Fig. 3. Let it be assumed that this arm moves to a position so that the baffle 7 is much nearer to the nozzle 8 than to the nozzle 9. Therefore the fluid pressure will be increased in the conduit 13 and decreased slightly in conduit 15. The increase in pressure in conduit 13 is immediately communicated to the capsular diaphragm 24 of the secondary amplifier causing it to expand and move its cage downward with the resultant downward movement of the right end of the horizontal bar 57. The decrease in fluid pressure in the conduit 15 at the same time causes the capsular diaphragm 25 to contract, thereby permitting the mentioned downward movement of bar 57. Simultaneously with the increase in fluid pressure in conduit 13 there is a similar increase in pressure in the branched conduit 13a so that the capsular diaphragm 14 of the primary amplifier expands. Also with a decrease in pressure in conduit 15, this decrease in pressure is also communicated through the branched conduit 15a to capsular diaphragm 16, which contracts. Therefore, when the diaphragm 14 expands and the diaphragm 16 contracts, the baffle 21 is moved away from the nozzle 22 to a position nearer to the nozzle 23. This movement of the baffle results in an increase in pressure in the conduit 38 and a decrease in pressure in the conduit 50. However, constrictions 39 and 51 together with the damping chambers 41 and 53 tend to delay the transmission of this change in fluid pressure, to capsular diaphragms 40 and 52. The action of the primary amplifier A by means of its baffle 21 and nozzles 22 and 23 greatly amplifies the response of the galvanometer 5, but this amplification of response is delayed by the constrictions and the mentioned damping chambers so that the action of the diaphragms 40 and 52 although relatively great, is delayed in becoming effective. However, in response to the increase in pressure in conduit 38, the capsular diaphragm 40 eventually expands, while in response to the decrease in fluid pressure in conduit 50, the diaphragm 52 eventually contracts. This operation of the diaphragms 40 and 52, through the mentioned cage connected to these diaphragms, eventually causes the left end of the horizontal bar 47 to be lowered. It will thus be seen that first the right end of this bar is lowered and subsequently the left end of this bar is lowered, so that as a result of the single response of the galvanometer 5 there are in the secondary amplifier A2, two responses, one of which is prompt and insensitive while the other is delayed but sensitive. The downward movement of the bar 57 opens the pilot valve permitting pressure fluid to pass through conduit 64 to conduit 65 and thence to the bellows 66 of the air motor. This increases the pressure in the bellows causing it to expand and to force the motor cage upward against the action of the spring 72. The cage in moving upward pulls the tape 78 upward against the action of spring 86 thereby rotating drum 80 clockwise. This drum rotates the shaft 81 and the drum 89, attached thereto. The drum 89 through the tapes 90 and 96 also rotates drum 92 and its shaft clockwise, while this shaft likewise rotates the resistor disc 99 and the drum 106 attached thereon in a clockwise direction. The drum 106 through the tape portions 109a and 109b attached thereto, moves the metal tape 109 so that the indicator 107 is moved toward the right over the scale 108. As the resistor disc 99 rotates successive portions of the coil 100 of resistor wire on its periphery, are engaged by the brush or wiper 105. This operation of the air motor continues to rotate the parts just described until the wiper 105 is so positioned on the resistor unit 100 that the network of which it is a part is again approximately balanced. In this form of the invention the network is only approximately balanced, since a small current must normally flow through the moving coil of the galvanometer in order that the movable portion of the air motor will remain in its new position of adjustment.

It will be understood that if the baffle 7 moves toward nozzle 9 instead of nozzle 8, the reverse of the operation just described will be effected to restore the balance of the network.

In the modified form of the invention generally shown in Fig. 5, a galvanometer 5 of identical construction to that shown in Fig. 1, has its baffle 7 supported midway between the rigidly mounted nozzles 8 and 9, for movement toward and away from the respective faces of these nozzles. A supply conduit 205 leading to a source of pressure fluid or liquid, communicates through the branched conduits 106 and 107 with the nozzles 8 and 9, as well as with the conduits 208 and 209. These last-named conduits communicate respectively with the capsular diaphragms 210 and 211, the outer surfaces of which are attached to the posts 212 and 213, mounted respectively on the uprights 214 and 215 of a supporting frame. The central portions of the inner or opposing faces of these diaphragms are connected to a rigid rod 216 on which there is adjustably mounted the baffle 217. This baffle extends midway between the nozzles 218 and 219 (constructed as shown in Fig. 11) and is movable under the influence of the diaphragms 210 and 211 toward or away from the ends or faces of these nozzles. The supply conduit 205 also communicates through branched conduits 220 and 221 and inlet orifices (not shown) with the conduits 222 and 223, of which the conduit 222 communicates with a metal bellows 224 while the conduit 223 communicates with the metal bellows 225. The outer ends of these bellows are respectively rigidly mounted on uprights 226 and 227 supported on the base 228 of a motor unit, while their common ends are joined to a rigid connecting bar 229 to which there is connected a rigid frame 230. This frame communicates through a universal coupling member with a pilot valve rod 232 forming a part of an oil motor.

The mentioned universal coupling includes a bearing surface or plate 233 (Fig. 7) on a rod 233a attached by member 230a to the frame 230, and a circular plate 234 carried by pilot valve rod 232 and having ears 234a. A ball or thrust bearing 235 engages the opposing faces of both the plates 233 and 234, since springs 236, spaced 120° apart and connected to part 230a of the frame and to ears 234a on plate 234, tend to pull the frame and valve rod together so that this valve rod can be rocked independently of the frame. Spiral springs 237, spaced 120° apart and engaging at their ends the ears on the plate 234 and the thrust bearing, hold this bearing in the position shown.

This pilot valve rod 232 is provided with two spaced cylindrical members 238 and 239 (Fig. 5) and with the valve member 240 more clearly shown in Figs. 10 and 10a. It will be noted that the valve member 240 has two V-shaped openings 240a in its shell portion terminating at their adjacent ends in a portion 240b which is just large enough to cut off the passage of oil from the conduit 274. This arrangement of the valve member ensures that any movement of slide valve rod 232 results in a corresponding change in the rate of movement of the piston 255 of the oil motor. This pilot valve moves in a chamber 241, the inner walls of which make a close fit with cylindrical members 238, 239 and with valve member 240. This chamber is provided with ports 250 and 251 and with the ports 252 and 253 leading to the piston chamber 254 of the oil motor. A piston 255 reciprocates in this chamber while its piston rod 256, which is guided at its free end in an upright support 257, is provided with a pin 258. This pin engages a vertical slot 259 in a sector gear 260 (Figs. 6, 8 and 9) which is pivoted at 261 for rocking movement. The sector gear engages a pinion 262 mounted on the shaft 263 which carries a disc 264 of insulating material having on its periphery a resistance unit 100 of coiled resistance wire with which a contactor 105 insulatedly supported on the base, engages. The face of this disc may be provided with graduations 267 which are carried by the disc in the path of the fixed pointer 268.

The oil motor just described requires a source of oil or other similar fluid under pressure and for this purpose an oil pump 269 is provided which pump is driven through the gears 270 and the shaft 271 of an electric motor 272. The pump serves to force the oil under pressure from the reservoir 273 through conduit 274 to the port which is controlled by the slide valve 240. It will be understood that the outlets 250 and 251 permit the oil after being used in the motor to drain back into the reservoir 273. In order to greatly reduce the friction opposing the movement of the parts carried by the valve rod 232, this rod is arranged to be rocked throughout the time that the system is in operation. In order to effect this rocking action, the motor shaft 271 through a worm gear connection drives the pulley 275. A belt 276 passing about this pulley drives the pulley 277 and pulley 277, through the arm 278 eccentrically driven therefrom and attached at its opposite end to sleeve 279, continuously rocks this sleeve which is so connected to the slide valve rod that the rod may move longitudinally independently of the sleeve, but partakes of the rocking movement thereof.

In the operation of this last described form of the invention let it be assumed that the normally balanced network (Fig. 3) which is connected to the galvanometer 5 becomes unbalanced, due to a change in the condition which it is desired to measure. Let it be assumed that the galvanometer 5 is so operated that the baffle 7 is moved in the direction of the nozzle 8. In response to this movement, fluid pressure increases in the conduit 208 to cause the diaphragm 210 to expand and as the baffle moves away from the nozzle 9, fluid pressure diminishes in the conduit 209 causing the diaphragm 211 to contract. Since the diaphragm 210 expands and the diaphragm 211 contracts, the baffle 217 will be moved in the direction of the nozzle 218. This movement results in an increase in pressure in the conduit 222 with the consequent expansion of the bellows 224 and a reduction in the fluid pressure in the conduit 223 with the resultant contraction of the bellows 225. Since the bellows 224 expands and the bellows 225 contracts, the frame 230 connected to the bar 229 at the common ends of these bellows, is moved toward the left. This movement of the frame is communicated through the universal coupling without lost motion to the slide valve rod 232 moving this rod and its valve 240 to the left. Oil under pressure is now supplied through the conduit 274 and the inlet port 252 of the oil motor. This flow of oil causes the piston 255 to move toward the left forcing the piston rod 256 toward the left. The pin 258 carried by the shaft rotates the sector gear 260 counter-clockwise which drives the pinion 262 to rotate the disc 264 carrying the resistor 100 in a clockwise direction until the contactor 105 engages such a point on this resistor that the network becomes exactly balanced. It will be understood that in this modification, it is not necessary for current to flow normally through the movable coil of the galvanometer, since the movable parts of the oil motor remain in the new position of adjustment without the application of a holding force.

It will be understood that if the condition in the network is such that the baffle 7 moves toward the nozzle 9 instead of toward the nozzle 8 in the modification of Fig. 5, as in the case assumed, the reverse of the above-described operations is brought about.

Although the electrical network for actuating the galvanometer 5 may take various forms, it is herein illustrated (Fig. 3) as an automatic potentiometer network including a thermocouple 291 functioning in response to changes in temperature to which it is exposed, to unbalance said network, while the relation of the contactor 105 with the resistor unit 100 of the potentiometer is controlled by the motor (either the air motor of Fig. 1 or the oil motor of Fig. 5) to restore the balance of the network.

I claim:

1. In an arrangement of the class described, a pair of spaced nozzles, each having an opening therein in substantial alignment with an opening in the other, a source of pressure fluid, a pair of conduits each connecting said source to the output of said conduits and through a restriction to the opening in one of said nozzles, a baffle movable between said nozzles to influence continually the pressure fluid streams issuing therefrom, a substantially balanced electrical system including a galvanometer responsive to the unbalance of said system, means including said galvanometer for moving said baffle between said nozzles, and means controlled at the output of said conduits for readjusting said system to restore a substantial balance thereof.

2. In an automatic system of the class described, a normally balanced network including means responsive to the lack of balance of said network, a pair of spaced nozzles each having an opening therein in substantial alignment with an opening in the other, a source of pressure fluid, a pair of conduits each connecting said source through a restriction to the opening in one of said nozzles, a baffle actuated by said means and movable only to approach one nozzle and recede from the other to continually influence the pressure fluid emerging therefrom, an expansible diaphragm in which each of said conduits terminates, the remote ends of said diaphragms being rigidly mounted and the opposing ends of said diaphragms being movable as a unit, a second baffle actuated by movement of the opposing ends of said diaphragms, a second pair of nozzles each provided with an opening in alignment with the opening in the other, a second pair of conduits each connecting said source through a restriction to the opening in one of said second nozzles, said second baffle being movable between the openings of said nozzles, and means responsive to fluid in said second pair of conduits for restoring a substantial balance of said network.

3. In an automatic system of the character described, a substantially balanced network including means responsive to the lack of balance of said network, a pair of spaced nozzles each having an opening therein in substantial alignment with an opening in the other, a source of pressure fluid, a pair of conduits each connecting said source through a restriction to the opening in one of said nozzles, a baffle actuated by said means in a path to approach one nozzle and to recede from the other thereby continually influencing the pressure fluid emerging therefrom, an expansible diaphragm in which each conduit terminates, the remote ends of said diaphragms being rigidly mounted and the opposing faces of said diaphragms being movable as a unit, a second baffle actuated by movement of the opposing faces of said diaphragm, a second pair of nozzles each provided with an opening in alignment with the opening in the other, a second pair of conduits each connecting said source through a restriction to the opening in one of said second nozzles, said second baffle being movable between the openings in said second nozzles, and means including a fluid motor controlled by said second pair of conduits for restoring a substantial balance of said network.

4. In a system of the class described, a pair of opposing nozzles connected through constrictions to a source of pressure fluid, a baffle movable between said nozzles in accordance with a changing condition to vary the escape of pressure fluid from said nozzles, pressure fluid operated means responsive to variations in the escape of fluid from said nozzles, said means operating in accordance with said variation to have a prompt insensitive response and a delayed sensitive response, and mechanism operated by said responses, jointly.

5. In a system of the class described, a pair of opposing nozzles connected through constrictions to a source of pressure fluid, a baffle movable between said nozzles to approach one nozzle and to recede from the other nozzle in accordance with a changing condition to vary the escape of pressure fluid from said nozzles, pressure fluid operated means responsive to variations in the escape of fluid from said nozzles, said means operating in accordance with said variation to have a prompt insensitive response and a delayed sensitive response, and mechanism operated by said responses, jointly.

6. In a system of the class described, a pair of opposing nozzles connected through constrictions to a source of pressure fluid, a baffle movable between said nozzles in accordance with a changing condition to vary the escape of pressure fluid from said nozzles, a primary pressure fluid operated amplifier actuated in response to variations in the escape of pressure fluid from said nozzles, a secondary amplifier having a relatively insensitive portion actuated in response to the escape of pressure fluid from said nozzles, and a second sensitive sluggish portion controlled by said primary amplifier, and mechanism jointly controlled by said first and second portions of said secondary amplifier.

7. In a pressure fluid operated amplifier system, two expansible diaphragms mounted in alignment and having their opposing ends joined together and their remote ends immovable with respect to said opposing ends, means for supplying pressure fluid to said diaphragms in accordance with an effect to be amplified, a pair of nozzles in opposing relation, a conduit having a constriction and connected to each nozzle for supplying pressure fluid thereto, a baffle controlled by the opposing ends of said diaphragms to vary the pressure fluid streams issuing from said nozzles, a pressure responsive means connected to each conduit between said constriction and said nozzle, and mechanism actuated by said pressure responsive means.

KARL H. HUBBARD.